United States Patent [19]
Hillyer

[11] 3,886,811
[45] June 3, 1975

[54] EPICYCLIC CHANGE SPEED HUBS

[75] Inventor: Anthony William Hillyer, Loughborough, England

[73] Assignee: Raleigh Industries Limited, Nottingham, England

[22] Filed: Mar. 11, 1974

[21] Appl. No.: 449,773

[30] Foreign Application Priority Data
Mar. 28, 1973 United Kingdom............ 14826/73

[52] U.S. Cl. ............... 74/750 B; 74/766; 74/781 B
[51] Int. Cl. ....... F16h 5/42; F16h 57/10; F16h 5/04
[58] Field of Search .............. 74/750 B, 766, 781 B; 192/6 A, 6 B

[56] References Cited
UNITED STATES PATENTS
| | | | |
|---|---|---|---|
| 2,301,852 | 11/1942 | Brown.................. | 74/766 |
| 2,687,050 | 8/1954 | Brown.................. | 74/750 B |
| 3,257,868 | 6/1966 | Preece................ | 192/6 A |
| 3,438,283 | 4/1969 | Schwerdhofer........ | 74/750 B |
| 3,721,135 | 3/1973 | Kelley................. | 74/766 |

FOREIGN PATENTS OR APPLICATIONS
| | | | |
|---|---|---|---|
| 348,621 | 10/1960 | Germany............ | 74/750 B |
| 483,992 | 4/1938 | United Kingdom... | 74/781 B |

Primary Examiner—Samuel Scott
Assistant Examiner—Allan R. Burke
Attorney, Agent, or Firm—Lilling & Siegel

[57] ABSTRACT

A five speed epicyclic change speed hub has two epicyclic gear trains utilizing a common planet cage and having an axially adjustable gear ring which is adapted selectively to control various uni-directional clutch means connecting the two gear rings with the hub shell between operative and inoperative conditions according to its position axially of the hub and to the combinations of operative and inoperative uni-directional clutch means appropriate to requisite drive transmission paths.

16 Claims, 11 Drawing Figures

3,886,811

EPICYCLIC CHANGE SPEED HUBS

The invention concerns epicyclic change-speed hubs and has more particular reference to a change-speed hub for a bicycle or the like.

Five-speed hubs for bicycles are known, but such hubs require the actuation of two separate control levers in moving throughout the full range of possible gear selection.

The primary object of the present invention is to provide a five-speed hub for a bicycle or the like wherein gear selection is controlled from a single lever.

According to the present invention an epicyclic change-speed hub comprises a hub axle, a plurality of sun gears secured to the said axle, a respective plurality of planet gears for each such sun gear, a respective gear ring for each plurality of planet gears, each plurality of planet gears being in mesh with its respective sun gear and with its respective gear ring, the respective pluralities of planet gears being supported on a common planet cage, respective unidirectional clutch means drivingly connecting each gear ring and the planet cage with the hub shell and an axially adjustable coupling means adapted to receive a drive motion from an input member and selectively cooperable with the planet cage or with one of the gear rings for transmitting a drive motion thereto, the said one gear ring being adjustable axially of the hub and being adapted according to its position in the axial direction of the hub to render inoperative the unidirectional clutch means connecting such gear-ring with the hub-shell or such unidirectional clutch means and that unidirectional clutch means connecting another gear ring with the hub shell, the coupling means and planet cage being adapted automatically to be mutually disengaged, if in a condition of engagement, on reverse motion of the coupling means.

The invention will now be described further, by way of example only, with reference to the accompanying drawings illustrating one embodiment thereof and in which:

FIGS. 7 to 10 are sections taken on lines E—E, F—F, G—G and H—H of FIG. 3 respectively.

Figure 1:
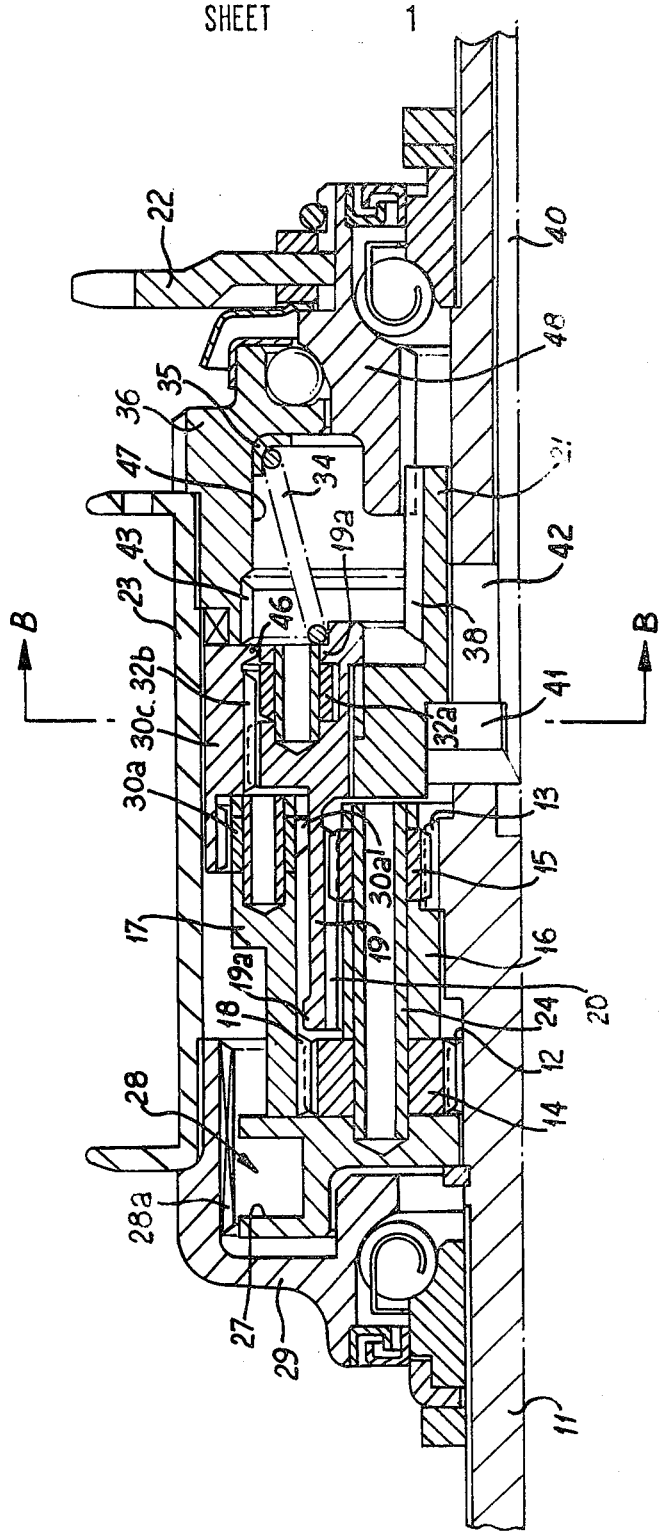
FIG. 1 is a longitudinal section taken through a five-speed hub constructed in accordance with the invention, the relative disposition of parts being appropriate to the high, or fifth, gear condition of the hub.

Referring now to FIGS. 1 to 10 of the drawings, a five-speed change-speed gear hub for a bicycle includes a hub axle 11, first and second fixed sun gears 12, 13 formed integrally with the said axle and in axially spaced disposition thereon, first and second pluralities of planet gears 14, 15 provided for and each in mesh with a respective one of the sun gears 12, 13, a planet cage 16 supporting the said planet gears in angularly spaced disposition about the related sun gears, an axially fixed gear ring 17 having internal gear teeth 18 in register and in mesh with the first plurality of planet gears 14, an axially slidable gear ring 19 having elongated internal gear teeth 20 in register and in mesh with the second plurality of planet gears 15, the slidable gear ring 19 being arranged in partly axially overlapped relationship with and radially inwardly of the fixed gear ring 17, a coupling sleeve 21 drivingly connected with a chain sprocket 22 through a driver, the coupling sleeve being shiftable in the axial direction of the hub for selective cooperation with the planet cage 16 or with the slidable gear ring 19, and a hub shell 23 within which the foregoing elements are disposed in coaxial or axially parallel relationship, as appropriate. The hub further includes a plurality of unidirectional clutch means for transmitting a drive between various of the elements, as hereafter to be made apparent. Corresponding planet gears 14, 15 of the first and second pluralities thereof are mounted on a common planet pin 24 engaged with the planet cage 16, the said cage having axially extending dogs 25 at that end thereof adjacent the coupling sleeve 21 for cooperation with oppositely directed dogs 26 on the end of the said sleeve, the dogs 25 on the planet cage 16 being backed-off, as is evident from the lower part of FIG. 2 of the drawings, (as is known in the art) in order that the sleeve will shift axially of the hub and out of drive engagement with the planet cage automatically upon reverse motion of the sleeve relative to the cage. The back-off dogs 25 on the planet cage are angularly interposed between successive planet pins 24 in the peripheral direction of the planet cage.

The planet gears 14 of the first plurality thereof each have fourteen teeth while the cooperating fixed sun gear 12 has sixteen teeth. The planet gears 15 of the second plurality have ten teeth and the corresponding sun gear 13 has twenty teeth.

The outer end of the planet cage has a peripheral groove 27 therein to receive the pawls 28b (FIG. 7) of a pawl and ratchet means 28, such pawls being in register and cooperable with an internal ratchet ring 28a formed on an end cover 29 secured to the hub shell 23.

The axially fixed gear ring 17 has a generally cylindrical bore thereto, the internal teeth 18 of such gear-ring being 44 in number, meshing with the first plurality of planet gear 14 and being provided adjacent to one end of the gear ring. At its opposite end, the gear ring supports a plurality of pawls 30a in respective pockets 31 therein, the said pawls 30a, which pawls have tails 30a$^1$ which extend inwardly of the gear ring 17, cooperating with a first row of internal ratchet teeth 30b on a ratchet ring 30c located at the bore of the hub shell and secured relative to such shell for motion therewith.

The slidable gear ring 19 has, at one end, a sleeve-like part extending axially of the hub and carrying the internal long spur teeth 20 aforesaid, the internal teeth being forty in number and the sleevelike part being located in the annular space between the planet cage 16 and the fixed gear ring 17. At its outer periphery the sleeve-like part has an enlargement 19a, the enlargement being provided closely adjacent the inner end of the slidable gear ring. At the other end the gear ring supports two sets of pawls 32a 33a (see FIG. 6) arranged alternately in a common diametrical plane and cooperable respectively with a second row of internal ratchet teeth 32b on the ratchet ring 30c and with ratchet teeth 33b provided on the coupling sleeve 21. The slidable gear ring 19 is spring-loaded inwardly of the hub by means of a helical spring 34 of which one end seats against a shoulder 19a on the gear ring 19 and the other end seats on a washer 35 provided inwardly of an end closure cap 36 secured to the hub shell.

The coupling sleeve 21 is slidably mounted on the hub axle 11 and is of stepped configuration, the inner end face of the sleeve including the plurality of dogs 26 for cooperative engagement with the dogs 25 provided on the planet cage 16, as has been disclosed. The inner end of the sleeve further includes those ratchet teeth 33b which cooperate with one, namely the internally operating pawls 33a of the sets of pawls carried by the slidable gear ring. The outer end of the sleeve is of reduced diameter and the periphery thereat is formed with splines 38 for cooperation with complementary splines 39 on the driver 48.

A control rod 40 is provided for adjusting the positions of the coupling sleeve axially of the hub for gear selection purposes, the said rod 40 operating on the coupling sleeve through a pin 41 engaged with an elongate slot 42 in the axle in conventional manner.

The closure cap 36 has internal ratchet teeth 43 thereon for cooperation with the outwardly operating pawls 32a of the two sets of pawls carried by the slidable gear ring, and the inner annular end face of the closure cap has axially directed dogs 44 for cooperation with corresponding dogs 45 on the adjacent end of ratchet ring 30c for securing such latter ring to the closure cap (and hence to the hub shell) to transmit a drive motion to the hub shell.

The operation of the hub is as follows:

With the relative disposition of parts shown in FIG. 1 which disposition corresponds to a high gear (or top) condition of the hub, the coupling sleeve 21 is at its innermost position, being urged towards such position by the spring 34 operating on the slidable gear ring which, in turn, loads the sleeve inwardly of the hub, and is drivingly connected with the planet cage through the cooperating dogs 25, 26 on the cage and sleeve respectively. The pawls 32a on the slidable gear ring are in mesh with the related ratchet teeth 32b on the ratchet ring 30c. In top gear, the drive transmission path from the driver 48 is from such driver to the coupling sleeve and thence to the planet cage. From the planet cage, the drive is through the planet gears 15 to the slidable gear ring and then, via pawls 32a and ratchet teeth 32b to the hub shell 23. In the high gear condition of the hub, on drive the pawl and ratchet means 28a 28b, 30a 30b and 33a 33b are overrunning.

Adjustment of the hub by displacement of the coupling sleeve to the right, as seen in the drawing, will bring the noses of pawls 32a into engagement with a land 46 between ratchets 32b and 43 and thus will disengage the pawls 32a from the ratchet teeth 32b. The drive transmission path will be from the driver 48 through the coupling sleeve 21 to the planet cage 16, via the cooperating dogs 25, 26 and thence through planet gears 14 to the axially fixed gear ring 17, the final drive from the gear ring 17, being through the pawl and ratchet means 30a 30b.

As in the case of high gear, pawl and ratchet means 28a 28b and 33a 33b are over-running during fourth gear operation of the hub.

In order to avoid a 'lock-up' of the hub on application of a reverse motion to the driver, the coupling sleeve must be drivingly disengaged from the planet cage. This disengagement is effected by cooperation between the 'backed-off' faces of the dogs on the planet cage and the adjacent faces of the dogs on the sleeve to cam the two elements apart.

A further shift of the coupling sleeve to the right, so as to give normal gear, or direct drive, disengages the cooperating dogs 25, 26 and brings the pawls 32a into register with the teeth of pawl ring 43 and with this relative disposition of parts (see the lower part of FIG. 2) the drive transmission path is from the driver to the coupling sleeve and from such sleeve to the shiftable gear ring via the pawls 33a and cooperating ratchet teeth 33b. From the gear ring 19 the drive is to the hub shell through pawls 32a such pawls being engaged with ratchet 43. As before, pawls and ratchets 28a 28b and 30a 30b are over-running.

Figure 3:
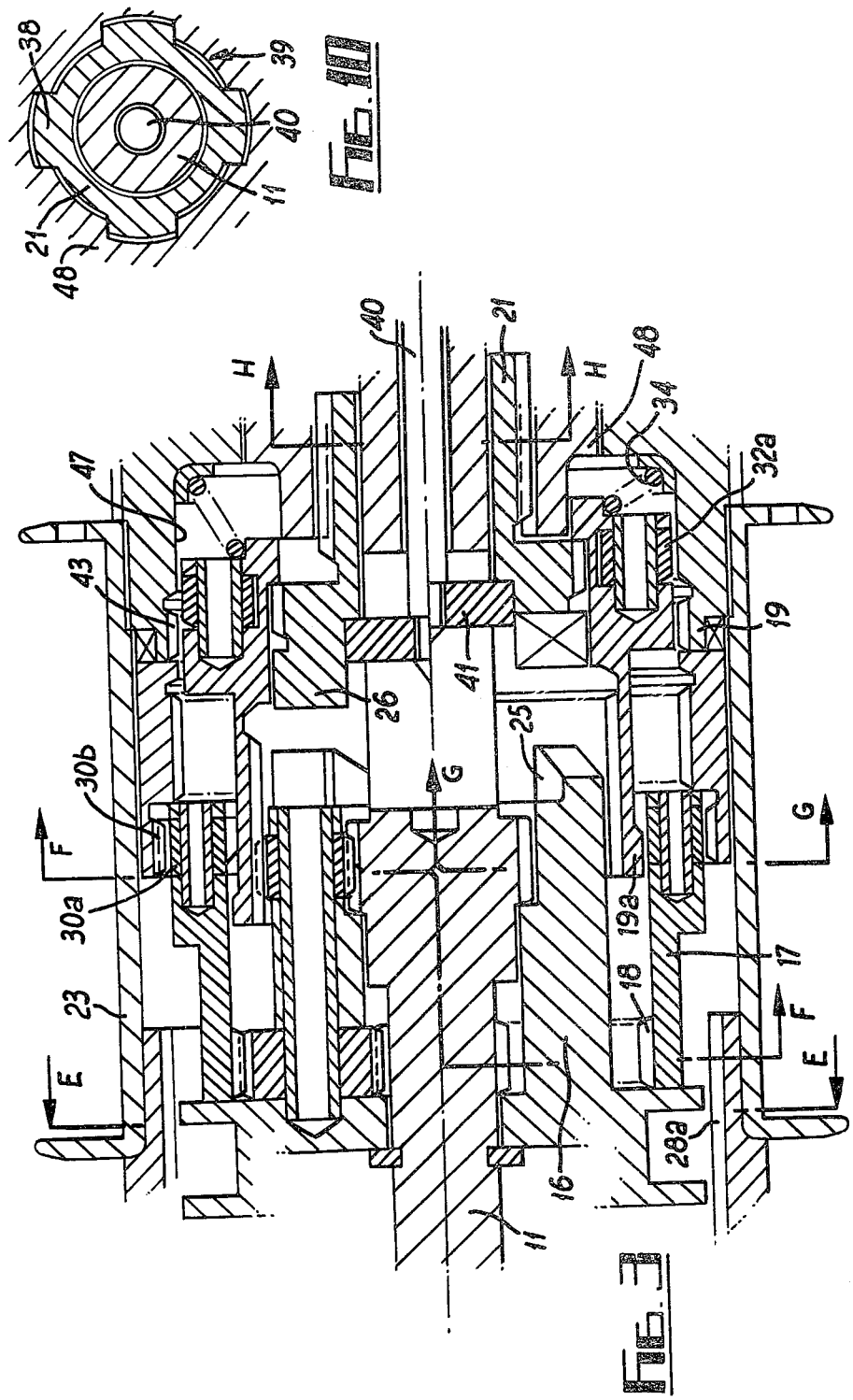
FIG. 3 is a view similar to FIG. 2 and shows second and low, or first, gear conditions in the upper and lower parts respectively.
Figure 4:
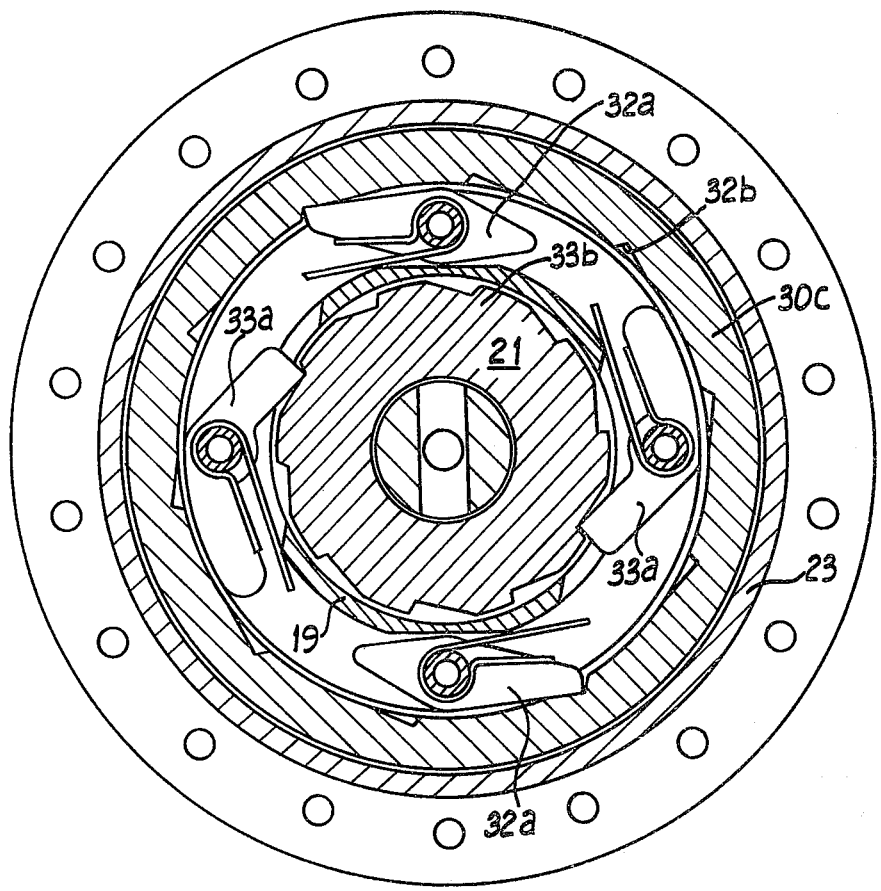
FIG. 4 is a section taken on line B—B of FIG. 1.
Figure 5:
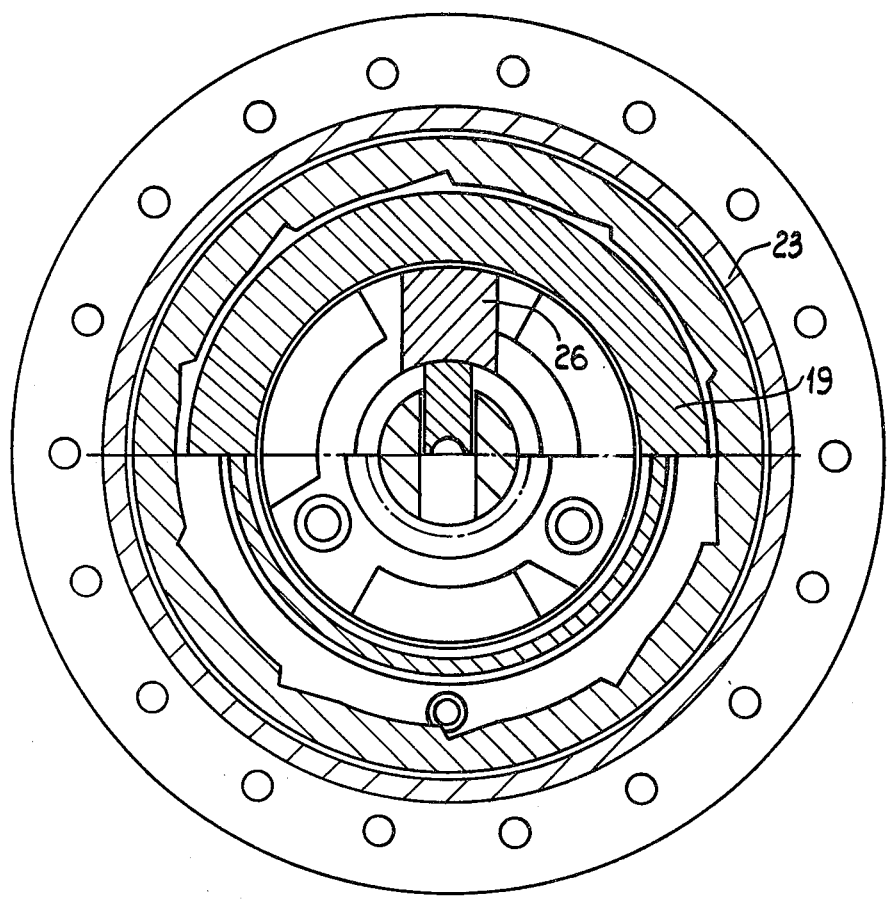
FIGS. 5 and 6 are sections taken on lines C—C and D—D of FIG. 2 respectively.
Figure 6:
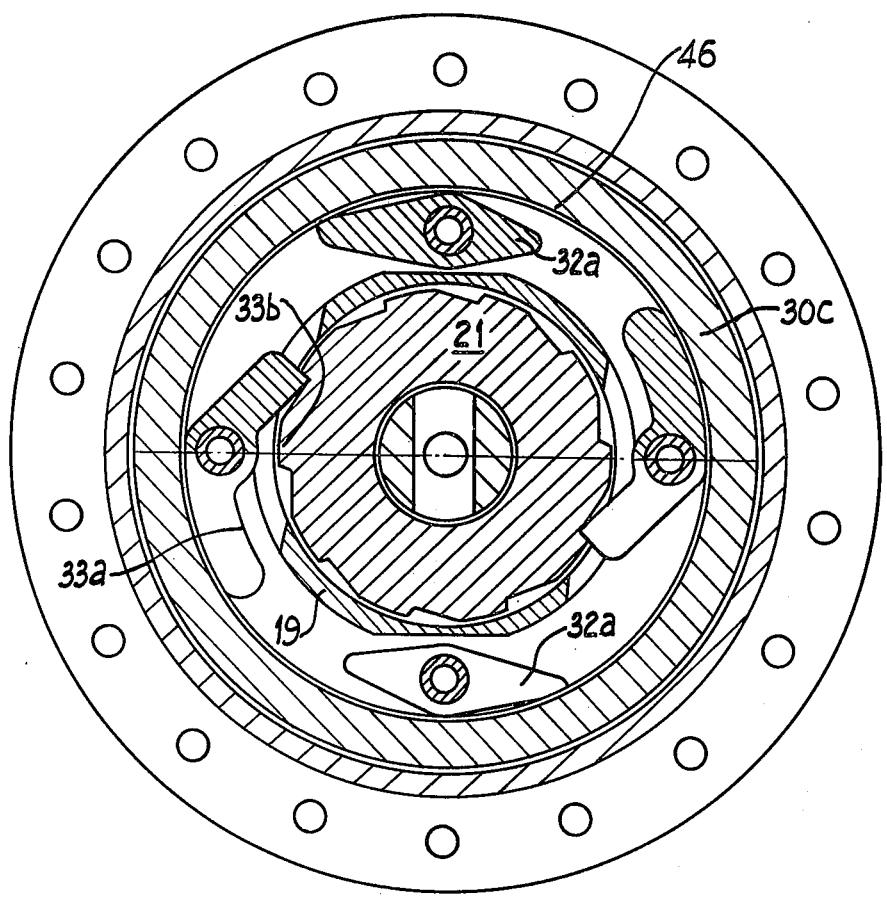
Figure 7:
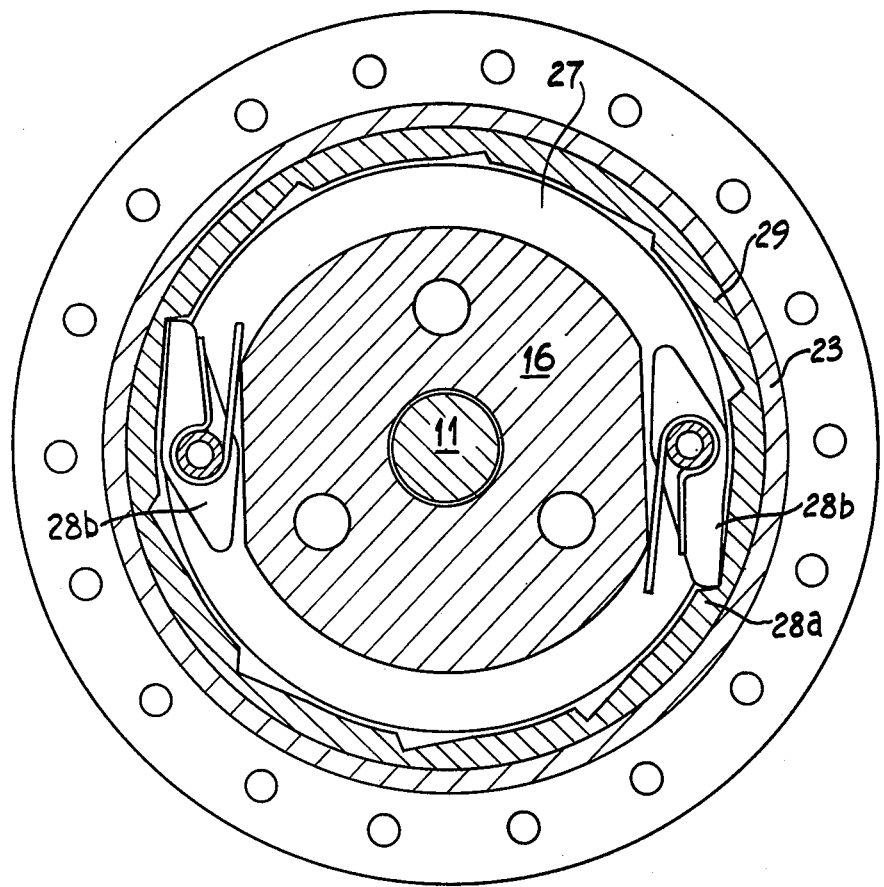
Figure 8:
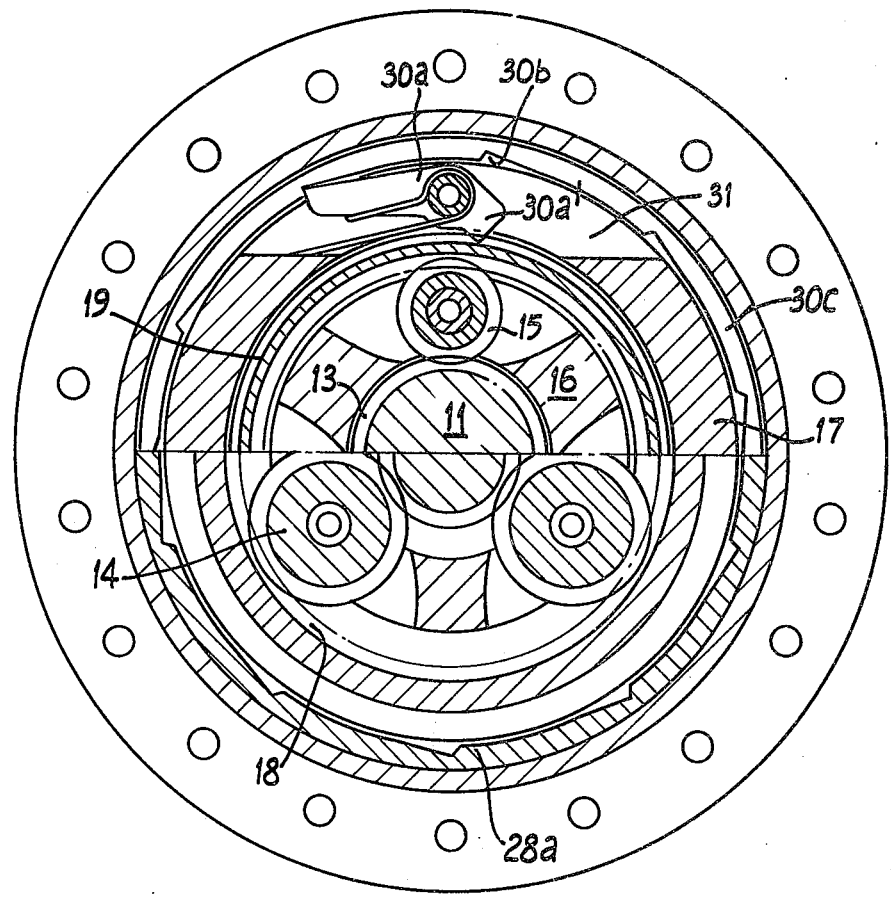
Figure 9:
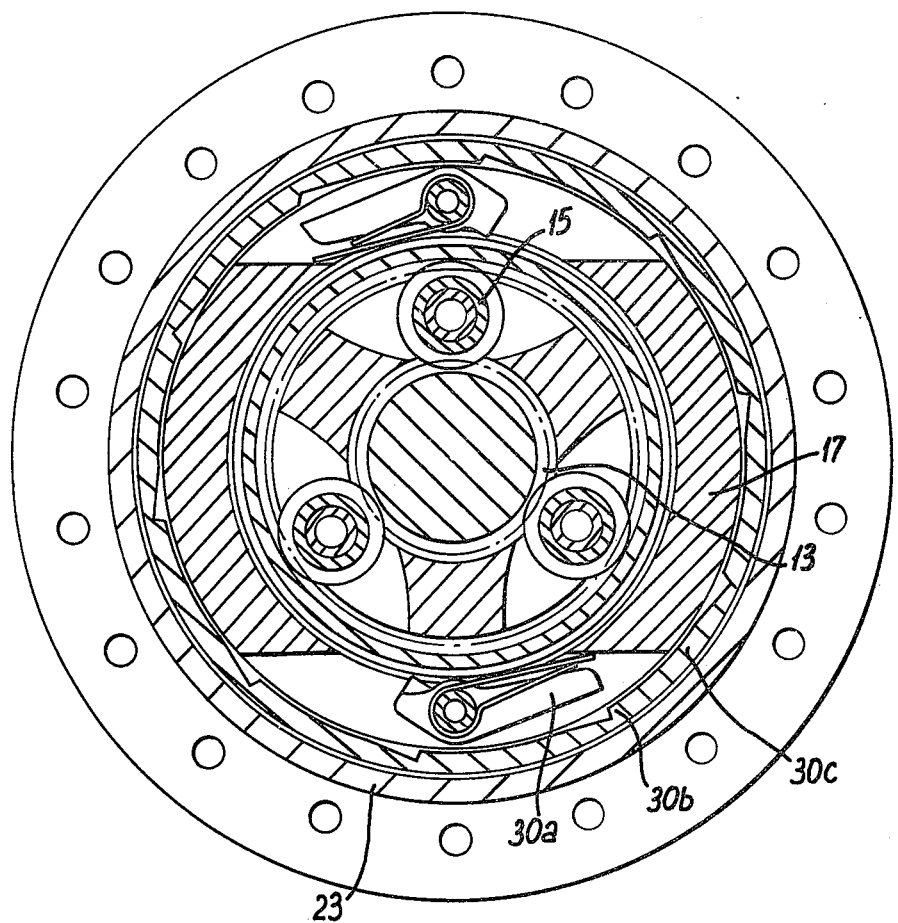

A still further adjustment, see the upper part of FIG. 3 moves the shiftable gear ring to the right and brings the pawls 32a into engagement with the inner cylindrical surface 47 of the end cover in such manner that the pawls 32a are tripped out of engagement with the ratchet teeth 43. The drive transmission path is from the driver to the coupling sleeve and from such sleeve to the shiftable gear ring 19 through pawls 33a and ratchet teeth 33b. Rotation of the gear ring effects rotation of the planet cage which, in turn, rotates the axially fixed gear ring, the final drive to the hub being through pawls 30a and ratchet teeth 30b. In this gear condition, namely second gear, pawls 28a are being overrun by the related ratchet ring whilst pawls 32a are tripped.

Bottom gear is selected by a still further adjustment of the coupling sleeve to the right (lower part of FIG. 3) to bring the enlargement 19a on the shiftable gear ring into engagement with the tails $30a^1$ on the pawls so as to trip such pawls out of engagement with the teeth 30b of the related ratchet ring. The drive transmission path is from the driver to the shiftable gear ring, as in the case of second gear, and from the gear ring 19 to the planet cage through planet gears 15. The final drive is from the planet cage to the hub shell through pawls 28b and ratchet teeth 28a.

Second gear is selected from first gear by permitting an inward movement of the control rod under the influence of the spring 34, the shiftable gear ring moving to release the pawls 30a for engagement with the related ratchet teeth 30b.

Figure 2:
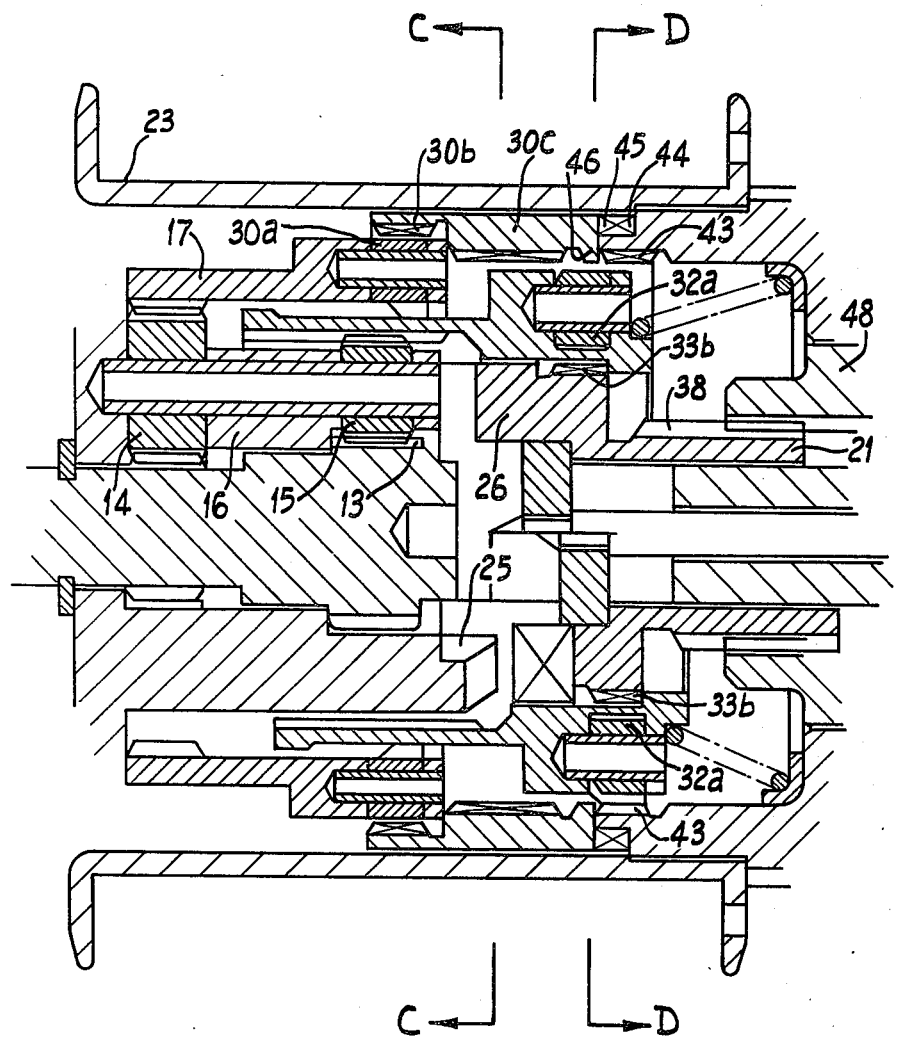
FIG. 2 is a view corresponding to a part of FIG. 1 and shows, in the upper part, the relative disposition of parts appropriate to the fourth gear condition of the hub and, in the lower part, the relative disposition of parts appropriate to the normal, or third, gear condition of the hub.

The remaining gears are selected by incremental movements of the control rod to allow the hub parts to assume, successively, the relative dispositions shown in the lower and upper parts of FIG. 2 and in FIG. 1.

With the gear parameters hereinbefore specified, we are able to provide a five-speed hub for a bicycle having the following ratios:

| Gear No. 5 (top gear) | 50% increase |
| Gear No. 4 | 36.5% increase |
| Gear No. 3 (Normal) | Direct drive |
| Gear No. 2 | 9% reduction |
| Gear No. 1 | 35% reduction |

These ratios can readily be varied by suitable selection of the relative sizes of the sun gears of their related planet gears and of the internal gears of the fixed and shiftable gear rings.

Figure 11:
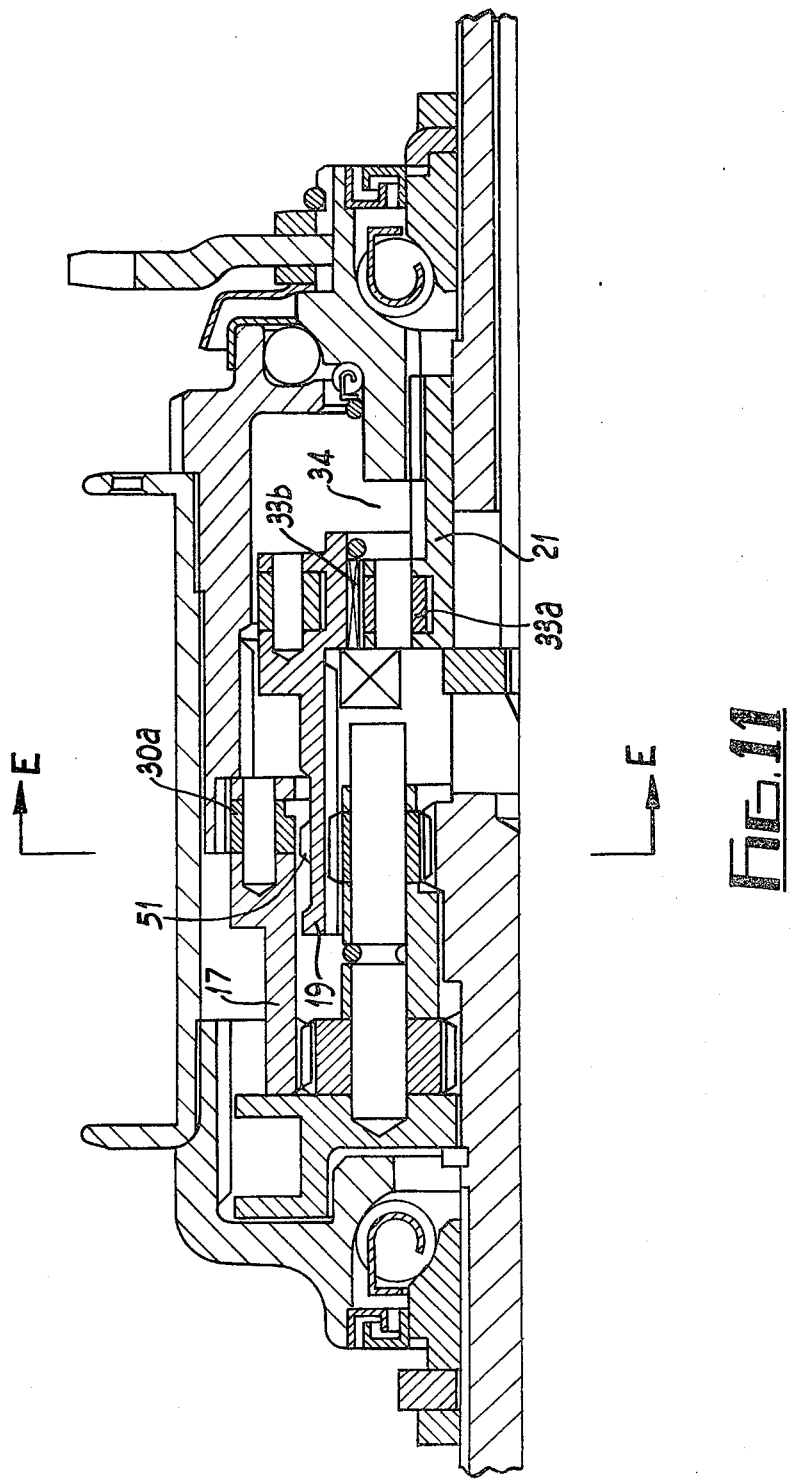
FIG. 11 is a longitudinal section taken through a modified hub.

In an alternative arrangement, see now FIG. 11, in order to avoid the need to provide the ratchet ring 30c and the closure cap 36 as two separate parts dogged together, an additional set of ratchet teeth 51 is provided intermediate the ends of the slidable gear ring 19, such teeth being co-operable with the pawls 30a on the fixed gear ring 17 to transmit a drive to the hub shell in normal gear. In the case of the hub shown in FIG. 11, the helical spring 34 is disposed between a bearing cage on the driver and the slidable gear ring, while the pawl and ratchet means for providing a drive connection between the coupling sleeve 21, and slidable gear ring 19 is reversed in that the pawls 33a are carried by the coupling sleeve and co-operate with ratchet teeth 33b on the gear ring.

The invention is not restricted to the exact features of the embodiments described and illustrated since alternatives will readily present themselves to one skilled in the art. Thus, for example, the invention herein disclosed may be used in the production of multi-speed epicyclic hubs having more than five speeds.

While it is convenient, in the hub herein disclosed, to use unidirectional clutch means which comprise co-operating pawl and ratchet means, any other conventionally used unidirectional clutch means may be embodied, if preferred.

What we claim is:

1. An epicyclic change-speed hub comprising a hub axle, a hub shell a plurality of sun gears secured to the said axle, a respective plurality of planet gears for each such sun gear, a respective gear ring for each plurality of planet gears, each plurality of planet gears being in mesh with its respective sun gear and with its respective gear ring, the respective pluralities of planet gears being supported on a common planet cage, respective unidirectional clutch means drivingly connecting each gear ring and the planet cage with the hub shell and an axially adjustable coupling means adapted to receive a drive motion from an input member and selectively co-operable with the planet cage or with one of the gear rings for transmitting a drive motion thereto, one of said gear rings being axially shiftable with respect to the hub and being adapted according to its position in the axial direction of the hub to render inoperative a first unidirectional clutch means connecting said axially adjustable gear ring with the hub shell and also able to render a second unidirectional clutch means associated with said fixed ring inoperative, and coupling means between said common planet cage and said axially adjustable coupling means being adapted automatically to be mutually disengaged, if in a condition of engagement on reverse motion of the coupling means.

2. An epicyclic change-speed hub as claimed in claim 1 wherein two sun gears and related epicyclic gear trains are provided.

3. An epicyclic change-speed hub as claimed in claim 2 further including a spring means against the restraint of which the axially shiftable gear ring moves.

4. An epicyclic change speed hub as claimed in claim 3 wherein the spring means comprises a helical spring disposed and operating between a seating on the shiftable gear ring and a hub end cap.

5. An epicyclic change-speed hub as claimed in claim 1 including manually actuable means for adjusting the axial position of the axially adjustable coupling means.

6. An epicyclic change-speed hub as claimed in claim 1 wherein the axially shiftable gear ring extends within an axially fixed gear ring and includes means adapted to render inoperative said second uni-directional clutch means drivingly connecting such axially fixed gear ring with the hub shell.

7. An epicyclic change speed hub as claimed in claim 6 wherein the means on the axially shiftable gear ring for rendering inoperative the said second unidirectional clutch means comprises a radially outwardly directed enlargement selectively cooperable with an element of said second unidirectional clutch means to trip such element according to the relative axial positions of the axially movable gear ring.

8. An epicyclic change speed hub as claimed in claim 1 wherein the axially shiftable gear ring has a third unidirectional clutch means connecting the said axially shiftable gear ring with the coupling means.

9. An epicyclic change speed hub as claimed in claim 8 wherein that uni-directional clutch means between the axially shiftable gear ring and the coupling means includes an actuable part on the coupling means and a cooperable part on the axially movable gear ring.

10. An epicyclic change speed hub as claimed in claim 9 wherein the actuable part comprises a pawl and the cooperable part comprises a ratchet.

11. An epicyclic change speed hub as claimed in claim 8 wherein the first and third unidirectional clutch means are disposed in a common radial plane of the axially shiftable gear ring.

12. An epicyclic change speed hub as claimed in claim 8 wherein said first uni-directional clutch means between the axially shiftable gear ring and the hub shell is operable in two axial positions of the said gear ring, there being means adapted to render the said first unidirectional clutch means inoperable at an intermediate axial position of the gear ring.

13. An epicyclic change speed hub as claimed in claim 12 wherein the said means for rendering said first uni-directional clutch means inoperative comprises a land operable on an actuable element of said first unidirectional clutch means.

14. An epicyclic change speed hub as claimed in claim 1 wherein the axially shiftable gear ring further includes a drive transmission means selectively cooperable with said first uni-directional clutch means in one axial position to transmit a drive motion to the hub shell through the said uni-directional clutch means.

15. An epicyclic change speed hub as claimed in claim 1 wherein the uni-directional clutch means each comprise pawl and ratchet mechanisms.

16. An epicyclic change speed hub including a hub shell, two epicyclic gear trains utilising a common planet cage and having an axially shiftable gear ring and a fixed gear ring with uni-directional clutch means associated with and connecting each of said gear rings with said hub shell, said axially shiftable gear ring adapted selectively to control said uni-directional clutch means connecting the two gear rings with the hub shell between operative and inoperative conditions according to its position axially of the hub.

* * * * *